United States Patent
MacDonald et al.

(10) Patent No.: US 7,271,982 B2
(45) Date of Patent: Sep. 18, 2007

(54) PERPENDICULAR MAGNETIC RECORDING HEAD BUILT USING AN AIR-BEARING SURFACE DAMASCENE PROCESS

(75) Inventors: Scott Arthur MacDonald, San Jose, CA (US); Ian Robson McFadyen, San Jose, CA (US); Neil Leslie Robertson, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 565 days.

(21) Appl. No.: 10/778,265

(22) Filed: Feb. 13, 2004

(65) Prior Publication Data

US 2005/0180048 A1    Aug. 18, 2005

(51) Int. Cl.
    *G11B 5/127*    (2006.01)
(52) U.S. Cl. ..................................... 360/125
(58) Field of Classification Search ............ None
    See application file for complete search history.

(56) References Cited

U.S. PATENT DOCUMENTS

| | | | |
|---|---|---|---|
| 4,943,882 A | 7/1990 | Wada et al. | |
| 5,225,953 A | 7/1993 | Wada et al. | |
| 6,757,141 B2 * | 6/2004 | Santini et al. | 360/317 |
| 7,031,121 B2 * | 4/2006 | Khera et al. | 360/317 |
| 7,120,988 B2 * | 10/2006 | Le et al. | 29/603.07 |
| 2002/0078554 A1 | 6/2002 | Kobayashi | |
| 2002/0176214 A1 * | 11/2002 | Shukh et al. | 360/317 |
| 2005/0024779 A1 * | 2/2005 | Le et al. | 360/317 |

FOREIGN PATENT DOCUMENTS

| | | |
|---|---|---|
| JP | 60205811 | 10/1985 |
| JP | 61020212 | 1/1986 |
| JP | 63081617 | 4/1988 |
| JP | 6448217 | 2/1989 |
| JP | 4074304 | 3/1992 |
| JP | 4102210 | 4/1992 |
| JP | 4178910 | 6/1992 |
| JP | 2001266310 | 9/2001 |
| JP | 2002216315 | 8/2002 |
| JP | 2002298309 | 10/2002 |

* cited by examiner

*Primary Examiner*—William Korzuch
*Assistant Examiner*—Mark Blouin
(74) *Attorney, Agent, or Firm*—David W. Lynch; Chambliss, Bahner & Stophel

(57) ABSTRACT

A method for forming a perpendicular magnetic recording head using an air-bearing surface damascene process and perpendicular magnetic recording head formed thereby is disclosed. The perpendicular head is formed by depositing a pseudo trailing shield layer over a pole layer and selectively etching the pseudo trailing shield layer to a depth equal to a desired trailing shield throat height. Then, a magnetic material is deposited in the resulting void.

34 Claims, 9 Drawing Sheets

PERPENDICULAR MAGNETIC RECORDING HEAD BUILT USING AN AIR-BEARING SURFACE DAMASCENE PROCESS

BACKGROUND OF THE INVENTION

1. Field of the Invention

The present invention relates generally to the field of data storage and retrieval, and more particularly to a method for forming a perpendicular magnetic recording head using an air-bearing surface damascene process and perpendicular magnetic recording head formed thereby.

2. Description of Related Art

The first disk drive was introduced in the 1950s and included 50 magnetic disks that were 24-inch in diameter rotating at 1200 RPM (rotations per minute). There has been huge progress in the field of hard disk drive (HDD) technology in almost 50 years since the introduction of the first disk drive. Moreover, the rate of this progress is increasing year after year. Such success has made hard disk storage by far the most important member of the storage hierarchy in modern computers.

The most important customer attributes of disk storage are the cost per megabyte, data rate, and access time. Improvements in areal density have been the chief driving force behind the historic improvement in hard disk storage cost. In fact, the areal density of magnetic disk drives continue to increase, with currently commercially disk drives available with areal densities over 100 billion bits per square inch. While nature allows us to scale down the size of each bit of information, it does not allow scaling to happen forever. Furthermore, while these difficulties have been associated with hard disk drives, similar conclusions would apply to magnetic tape and other magnetic technologies.

A magnetic recording head generally consists of two portions, which include a write portion for storing magnetically encoded information on a magnetic disc and a read portion for retrieving that magnetically encoded information from the disc. The read portion typically consists of a bottom shield, a top shield, and a sensor, often composed of a magnetoresistive (MR) material, positioned between the bottom and top shields. Magnetic flux from the surface of the disc causes rotation of the magnetization vector of a sensing layer of the MR sensor, which in turn causes a change in electrical resistivity of the MR sensor. The change in resistivity of the MR sensor can be detected by passing a current through the MR sensor and measuring a voltage across the MR sensor. External circuitry then converts the voltage information into an appropriate format and manipulates that information as necessary to recover the data that was encoded on the disc.

The write portion of the magnetic recording head typically consists of a top pole and a bottom pole, which are separated from each other at an air bearing surface of the write head by a gap layer, and which are connected to each other at a region distal from the air bearing surface by a back via. Positioned between the top and bottom poles are one or more layers of conductive coils encapsulated by insulating layers. The air bearing surface is the surface of the recording head immediately adjacent the magnetic medium or disc.

To write data to the magnetic medium, an electrical current is caused to flow through the conductive coils, thereby inducing a magnetic field across the write gap between the top and bottom poles. By reversing the polarity of the current through the coils, the polarity of the data written to the magnetic media is also reversed. Because the top pole is generally the trailing pole of the top and bottom poles, the top pole is used to physically write the data to the magnetic media. Accordingly, it is the top pole that defines the track width of the written data. More specifically, the track width is defined by the width of the top pole at the air bearing surface. The write portion and the read portion may be arranged in a merged configuration in which a shared pole serves as both the top shield of the read portion and the bottom pole of the write portion.

As storage capacity demands continue to increase, new serial technologies will gradually replace current parallel SCSI and ATA storage media during the next two years. Beyond these serial advances, hard-disk-drive vendors are working to develop even-more-advanced technologies to improve the physical data recording capacities of HDD magnetic media.

Many HDD manufacturers are beginning to explore a new magnetic recording technology called perpendicular data recording. Perpendicular recording heads for use with magnetic recording media have been proposed to overcome the storage density limitations of longitudinal recording heads.

In today's "longitudinal" HDD products, data bits are recorded on magnetic media using a recording method in which data bits are placed parallel to the media plane. Current longitudinal recording techniques can carry storage densities beyond 100 gigabits per square inch, but new recording methods will be necessary in the coming years to maintain the growth rate in HDD capacity.

To achieve higher storage capacity, drive makers must increase the areal density of the magnetic media. Current methods involve making data bits smaller and placing them closer together, but there are several factors that can limit how small the data bits can be made.

As the data bits get smaller, the magnetic energies holding the bits in place also decrease, and thermal energies can cause demagnetization over time, leading to data loss. This phenomenon is called the super-paramagnetic effect. To counter it, HDD manufacturers can increase the coercivity (the magnetic field required for the drive head to write the data on the magnetic media) of the disk. However, the amount of magnetic field that can be applied is determined by the type of magnetic material used to make the head and the way data bits are written, and vendors are approaching the upper limits in this area.

Perpendicular recording places data bits perpendicular to the magnetic media surface. The data bits are formed in upward or downward magnetic orientation so that transitions will represent 1s and 0s of digital data. Perpendicular recording gives hard drives a much larger areal density in which to store data because it can achieve higher magnetic fields in the recording medium.

Perpendicular recording heads typically include a pair of magnetically coupled poles, with the main pole having a significantly smaller surface area at the air bearing surface than the opposing pole. A coil is located adjacent to the main pole for inducing a magnetic field in the main pole. Magnetic recording media used with perpendicular recording heads typically include a magnetically hard upper layer. A magnetically soft lower layer will typically be located adjacent to the recording layer, opposite the recording head. Due to the difference in surface area between the main pole and opposing pole, and the magnetic flux passing through the soft underlayer between the two poles, the orientation of magnetic flux within the recording tracks will be oriented perpendicular to the recording medium, and parallel to the magnetic flux within the main pole.

The recording density is inversely proportional to the width of the recorded tracks. The width of these tracks is a function of the width of the recording head's main pole. Presently available main poles are currently produced through lithographic processes. The width of the main pole is therefore limited by the resolution of these lithographic processes. In the perpendicular head design with trailing shield, the trailing shield throat height has to be comparable to the gap and track width dimensions. Currently proposed designs for perpendicular heads with "trailing" shields require a "throat height" of less than 100 nm with a tolerance on this of 30 nm or less.

To achieve a "throat height" of less than 100 nm with a tolerance on this of 30 nm or less requires an edge-to-edge alignment between widely spaced layers in the recording head, i.e., the throat height defining layer and the GMR sensor stripe height defining layer that are on the order of 30 nm or less. This requires extremely tight tolerances on alignment and feature sizes during the wafer level process for building the recording head. Semiconductor tooling roadmaps for alignment tolerances suggest that 30 nm dimensions are achievable with leading edge tools, however, no path is currently seen to substantially less than 30 nm. Added to this alignment error are the variation in printed feature size (current semiconductor roadmaps indicate a number around 10 to 30 nm) and any errors in stripe height due to lapping the finished part to define the air bearing surface.

Possible solutions to this edge-to-edge alignment issue include head designs where the stripe height and throat height defining layers are patterned at the same time using a single photo mask. However, this involved a major redesign of the head to something commonly called a side-by-side head, and the process used to build it.

It can be seen then that there is a need for a method and apparatus for providing a perpendicular head that meets decreasing throat height tolerances with more accuracy than provided by photolithography resolutions.

SUMMARY OF THE INVENTION

To overcome the limitations in the prior art described above, and to overcome other limitations that will become apparent upon reading and understanding the present specification, the present invention discloses a method for forming a perpendicular magnetic recording head using an air-bearing surface damascene process and perpendicular magnetic recording head formed thereby.

The present invention solves the above-described problems by depositing a pseudo trailing shield layer over a pole layer and separated from said pole by a non-magnetic gap material and selectively etching the pseudo trailing shield layer from the air bearing surface to a depth equal to a desired trailing shield throat height. Then, a magnetic material is deposited in the resulting void.

A method for forming a perpendicular magnetic recording head using an air-bearing surface damascene process in accordance with an embodiment of the present invention includes depositing a non-etchable non-magnetic gap material over a main pole, depositing an etchable nonmagnetic material over the non-magnetic gap material, lapping the etchable nonmagnetic material, gap material and main pole, selectively etching the etchable nonmagnetic material to produce a void having a predetermined depth and filling the void with magnetic material.

In another embodiment of the present invention, a perpendicular magnetic recording head is provided. The perpendicular magnetic recording head includes a main pole, a non-etchable non-magnetic gap material deposited over the main pole, an etchable nonmagnetic material disposed over the gap material, the nonmagnetic material being recessed from a plane by a predetermined depth and magnetic material disposed over the main pole and gap material adjacent to the nonmagnetic material in an area between the nonmagnetic material and the plane.

In another embodiment of the present invention, a magnetic storage system is provided. The magnetic storage system includes at least one magnetic storage medium for storing data thereon, a motor for moving the at least one magnetic storage medium and an actuator arm assembly including a perpendicular head for reading and writing data on each of the at least one magnetic storage medium, the actuator positioning the perpendicular head relative to the moving at least one magnetic storage medium, wherein the perpendicular magnetic recording head further comprises a main pole, a non-etchable, non-magnetic gap material deposited over the main pole, an etchable nonmagnetic material disposed over the gap material, the nonmagnetic material being recessed from a plane by a predetermined depth and magnetic material disposed over the main pole adjacent to the nonmagnetic material in an area between the nonmagnetic material and the plane.

In another embodiment of the present invention, another perpendicular magnetic recording head is provided. This perpendicular magnetic recording head includes means for providing a pole for a write means, means, disposed over the pole, for defining a throat height, the means for defining a throat height being recessed from a plane by a predetermined depth and means, disposed over the means for providing a pole for a write means and adjacent to the means for defining a throat height, for providing a magnetic layer, the means for providing a magnetic layer being disposed in an area between the means for defining the throat height and the plane.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of embodiments of the present invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method for forming a perpendicular magnetic recording head using an air-bearing surface damascene process and perpendicular magnetic recording head formed thereby. The present invention is formed by depositing a pseudo trailing shield layer over a pole layer and selectively etching the pseudo trailing shield layer to a depth equal to a desired trailing shield throat height. Then, a magnetic material is deposited in the resulting void.

Figure 1:
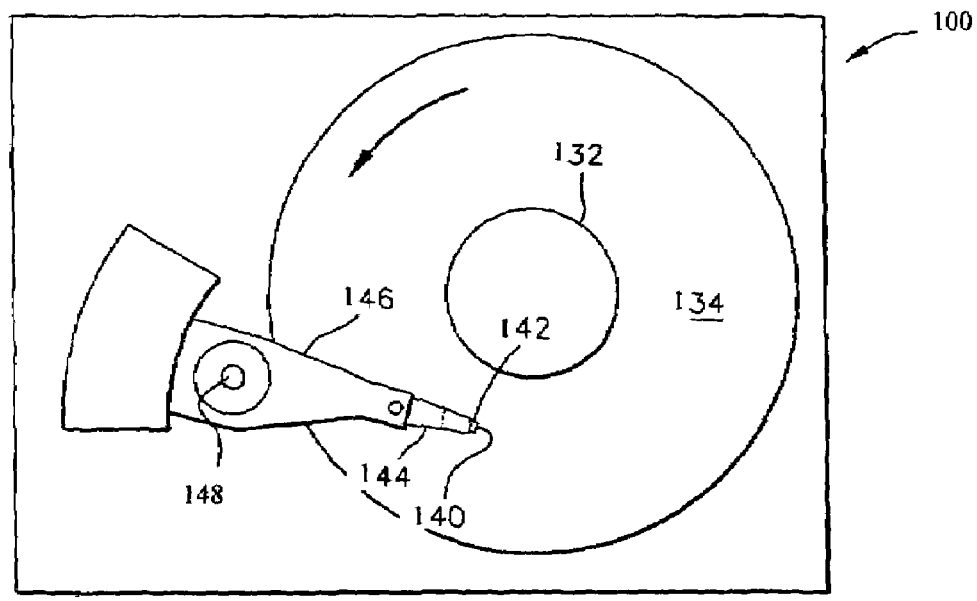
FIG. 1 illustrates a storage system according to an embodiment of the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
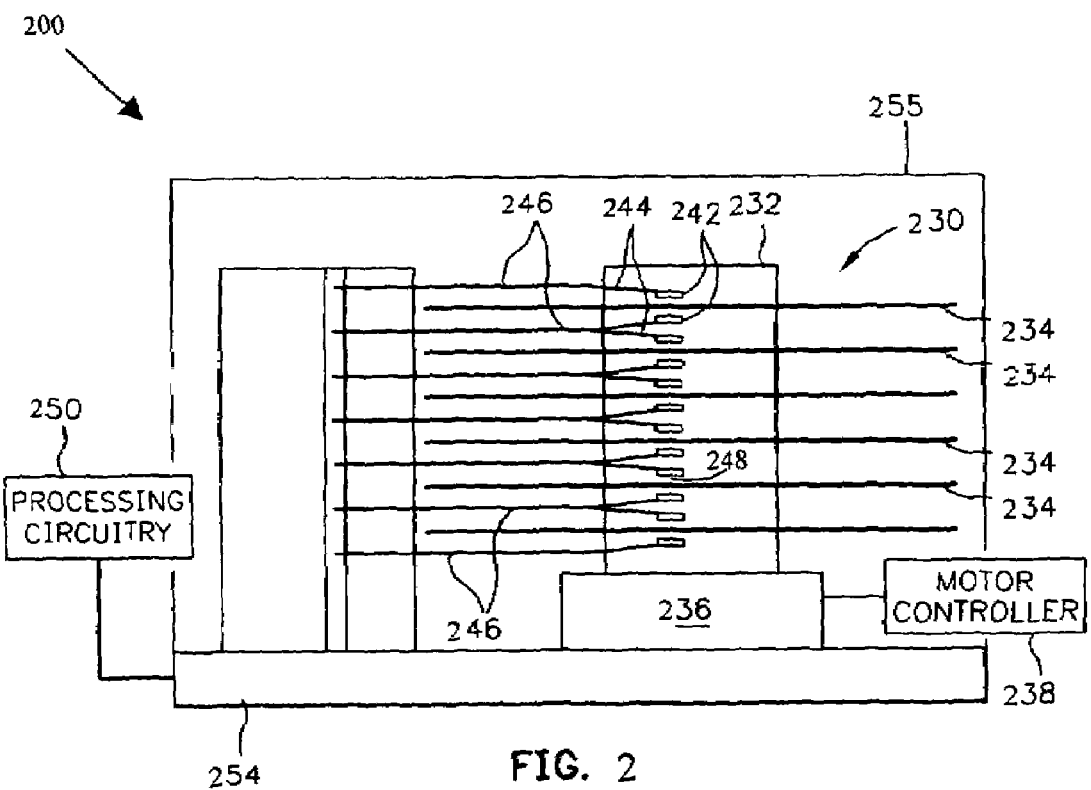
FIG. 2 illustrates one particular embodiment of a storage system according to an embodiment of the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air bearing surface (ABS) 248. The magnetic head may then be employed for writing information to multiple circular tracks on the surface of the disk 234, as well as for reading information therefrom.

Figure 3:
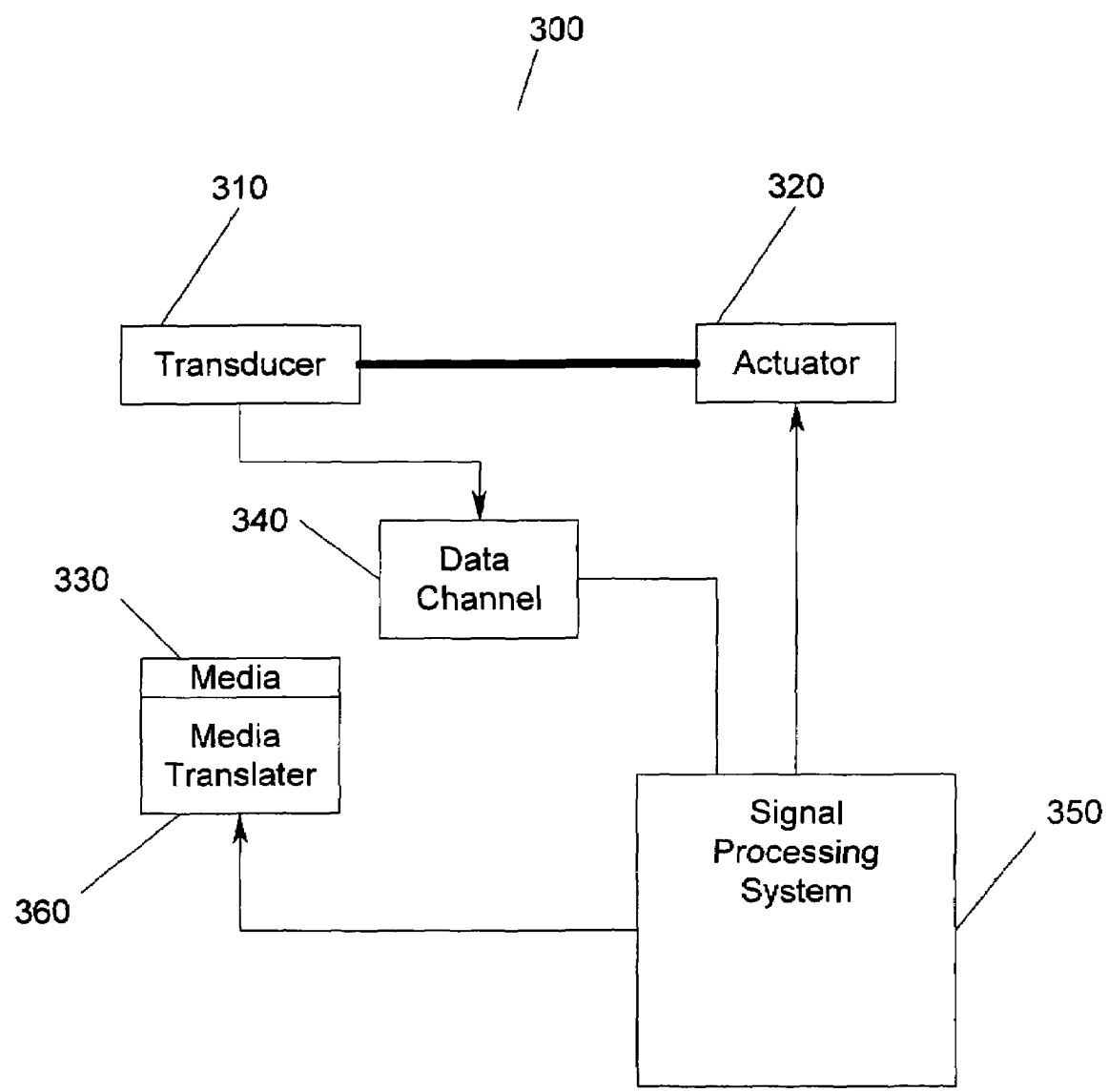
FIG. 3 illustrates a storage system according to an embodiment of the present invention.

FIG. 3 illustrates a storage system 300. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

Figure 4:
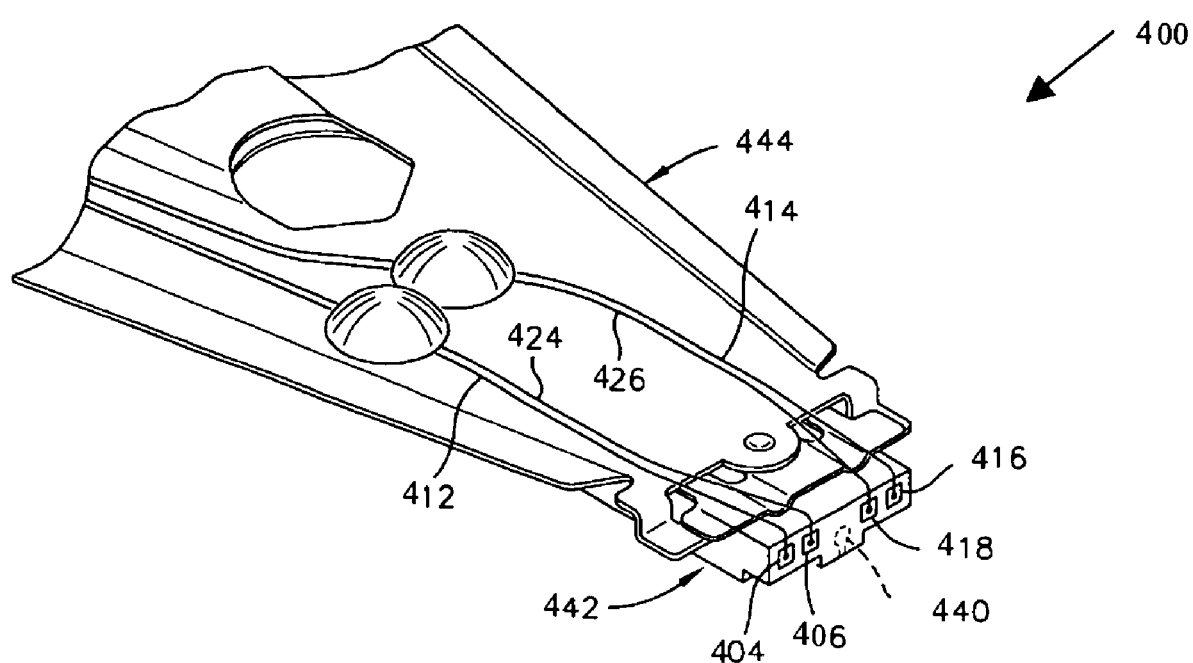
FIG. 4 is an isometric illustration of a suspension system for supporting a slider having a magnetic head mounted thereto.

FIG. 4 is an isometric illustration of a suspension system 400 for supporting a slider 442 having a magnetic head mounted thereto. In FIG. 4 first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

Figure 5:
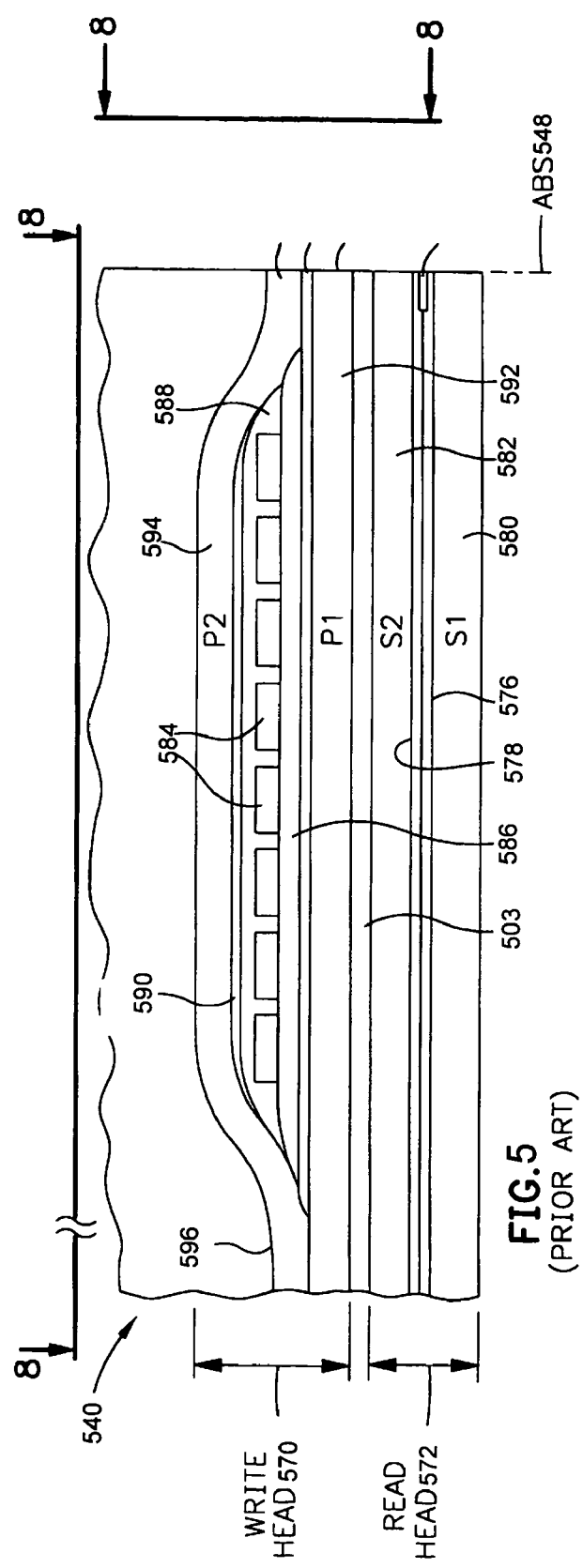
FIG. 5 is a side cross-sectional elevation view of a magnetic head showing the basic components thereof.
Figure 6:
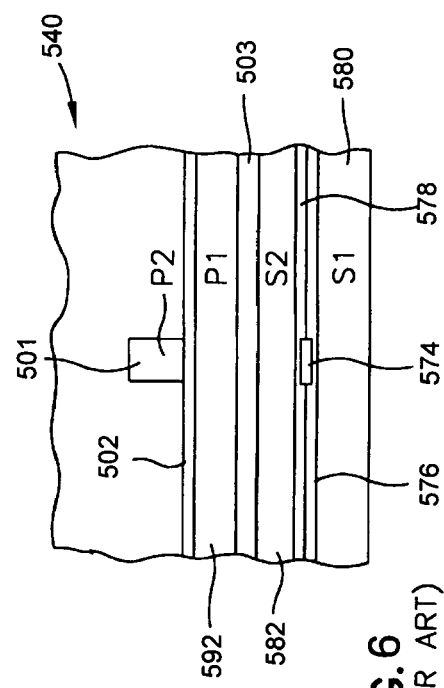
FIG. 6 is an air bearing surface (ABS) view of the magnetic head of FIG. 5.

FIG. 5 is a side cross-sectional elevation view of a magnetic head 540, which shows the basic components thereof. The magnetic head 540 includes a write head portion 570 and a read head portion 572. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. Alternatively, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current Is conducted through the sensor causes these resistance changes to be manifested as voltage changes. These voltage changes are then processed as readback signals by the signal processing system 350 shown in FIG. 3. Alternatively, the voltage across the sensor is fixed and the change in sense current is processed by the signal processing system 350.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS 548. The first pole piece layer 592 is separated from the second shield layer 582 by an insulation layer 503.

Figure 7:
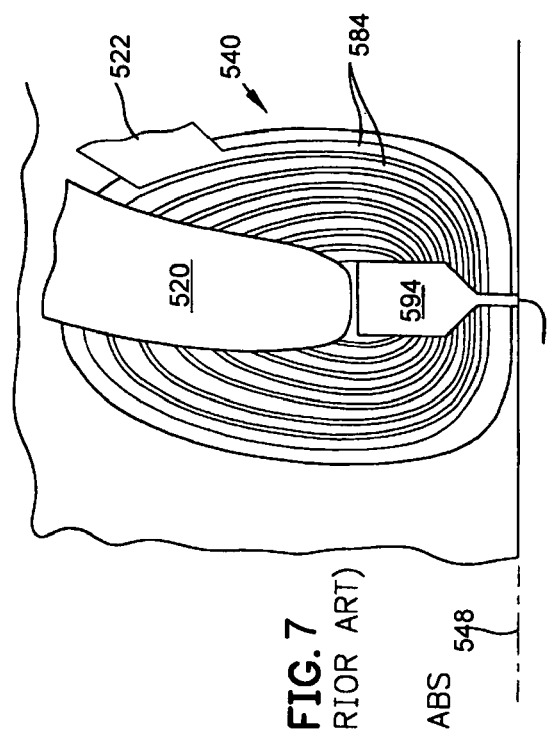
FIG. 7 illustrates the connect leads coupled to the coil for the write pole piece for the magnetic head of FIG. 5.

FIG. 7 illustrates a view of the connect leads 520, 522 coupled to the coil 584 for the write pole piece 594 of the head shown in FIG. 5. As shown in FIGS. 4-7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

Figure 8:
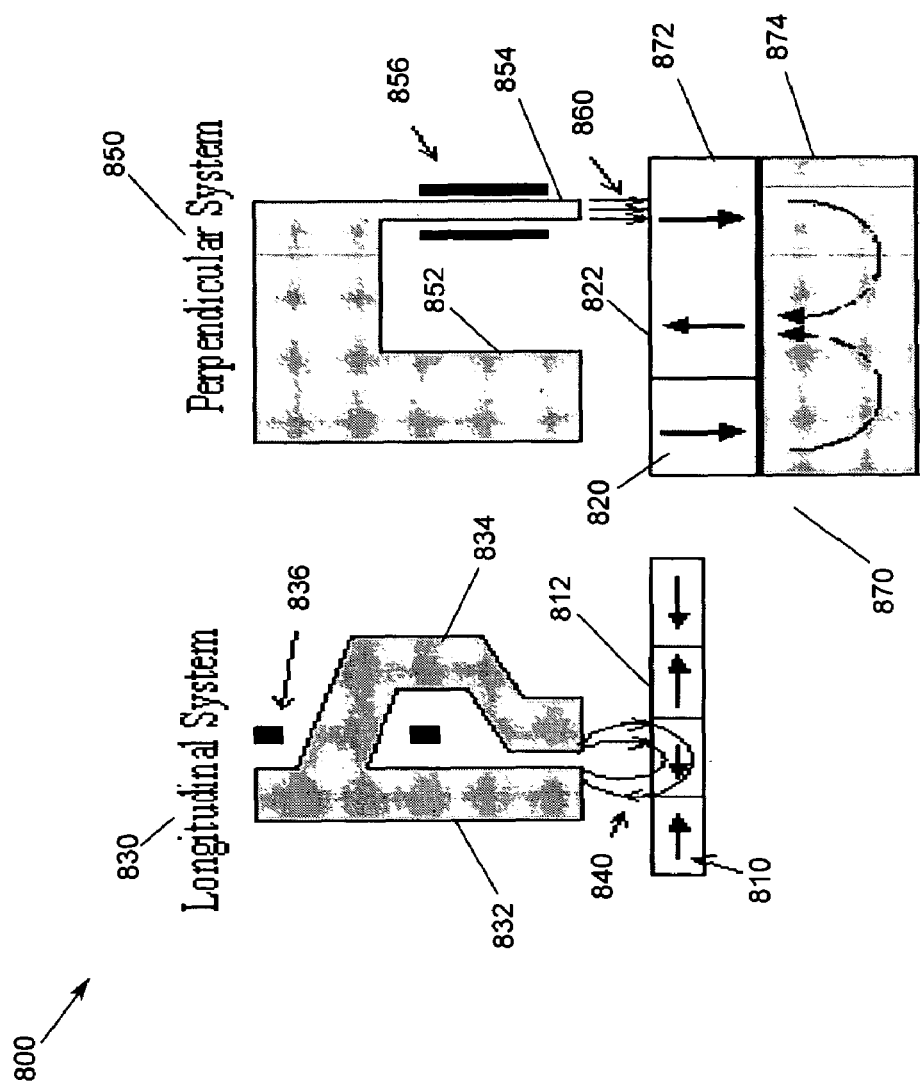
FIG. 8 illustrates the differences between longitudinal recording and perpendicular recording.

FIG. 8 illustrates the differences between longitudinal recording and perpendicular recording 800. In longitudinal recording, data bits 810 are recorded on magnetic media 812 using a recording method in which data bits are placed parallel to the media plane. To achieve higher storage capacity, perpendicular recording places data bits 820 perpendicular to the magnetic media surface 822. The perpendicular data bits 820 are formed in upward or downward magnetic orientation so that transitions may be detected as 1s and 0s of digital data. Perpendicular recording gives hard drives a much larger areal density in which to store data because the head can achieve higher magnetic fields in the recording medium.

A longitudinal recording head 830 includes a first 832 and second 834 pole. A coil 836 is formed around the second pole 834. Current through the coil 836 induces a magnetic field 840 at the write gap. Perpendicular recording heads 850 typically include a pair of magnetically coupled poles 852, 854. A coil 856 is located adjacent to a pole 854 for inducing a magnetic field 860 in a pole 854. Magnetic recording media 870 used with perpendicular recording heads typically includes an upper layer 872 that is magnetically hard. A magnetically soft lower layer 874 will typically be located adjacent to the recording layer 872, opposite the recording head 850. Due to the difference in surface area between the main pole 854 and opposing pole 852, and the magnetic flux passing through the soft underlayer 874 between the two poles 852, 854, the orientation of magnetic flux within the recording tracks will be oriented perpendicular to the recording medium surface 822, and parallel to the magnetic flux 860 within the main pole 854.

Figure 9:
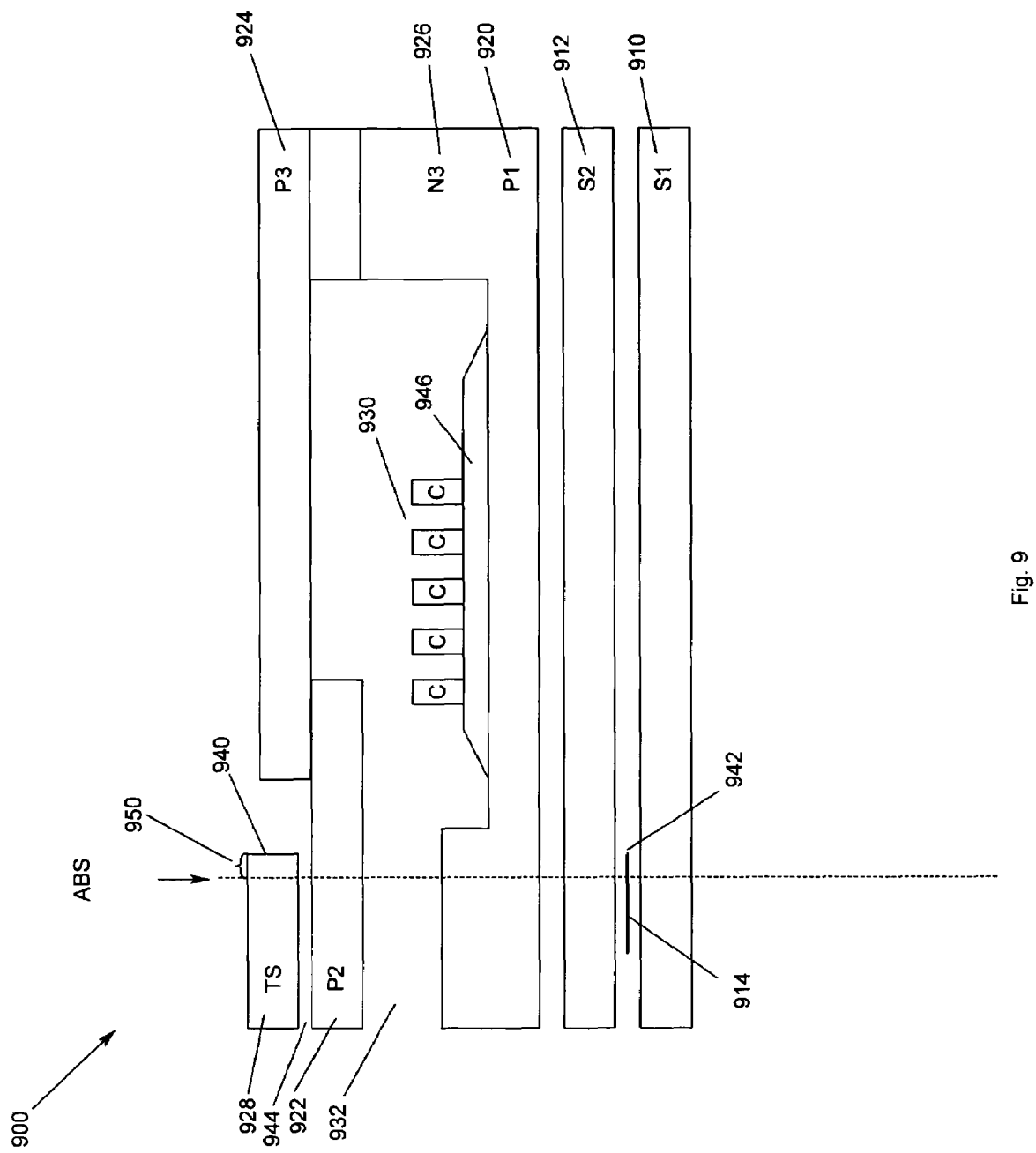
FIG. 9 illustrates a cross sectional view of a trailing shield perpendicular head.

FIG. 9 illustrates a cross sectional view 900 of a trailing shield perpendicular head. In FIG. 9, first 910 and second 912 shields are shown disposed about the GMR stripe 914. First pole 920, second pole 922, third pole 924, back gap 926 and trailing shield 928 layers are shown forming the write portion of the perpendicular head. The trailing shield layer 928 is separated from second pole 922 by a non-magnetic gap material 944. A coil 930 is formed between the first pole 920 and the second and third poles 922 and 924 over an insulating layer 946. Current through the coil 930 induces a magnetic field at the write gap 932. The back edge 940 of the trailing shield layer 928 has to be aligned to the back edge 942 of the GMR stripe 914 to within a small percentage of the desired trailing shield throat height 950. The throat height 950 is the length (height) of the pole portion 922 facing the trailing shield 928. The back edge 940 of the trailing shield layer 928 is usually defined by a photo layer, which does not provide the necessary alignment accuracy.

Figure 10:
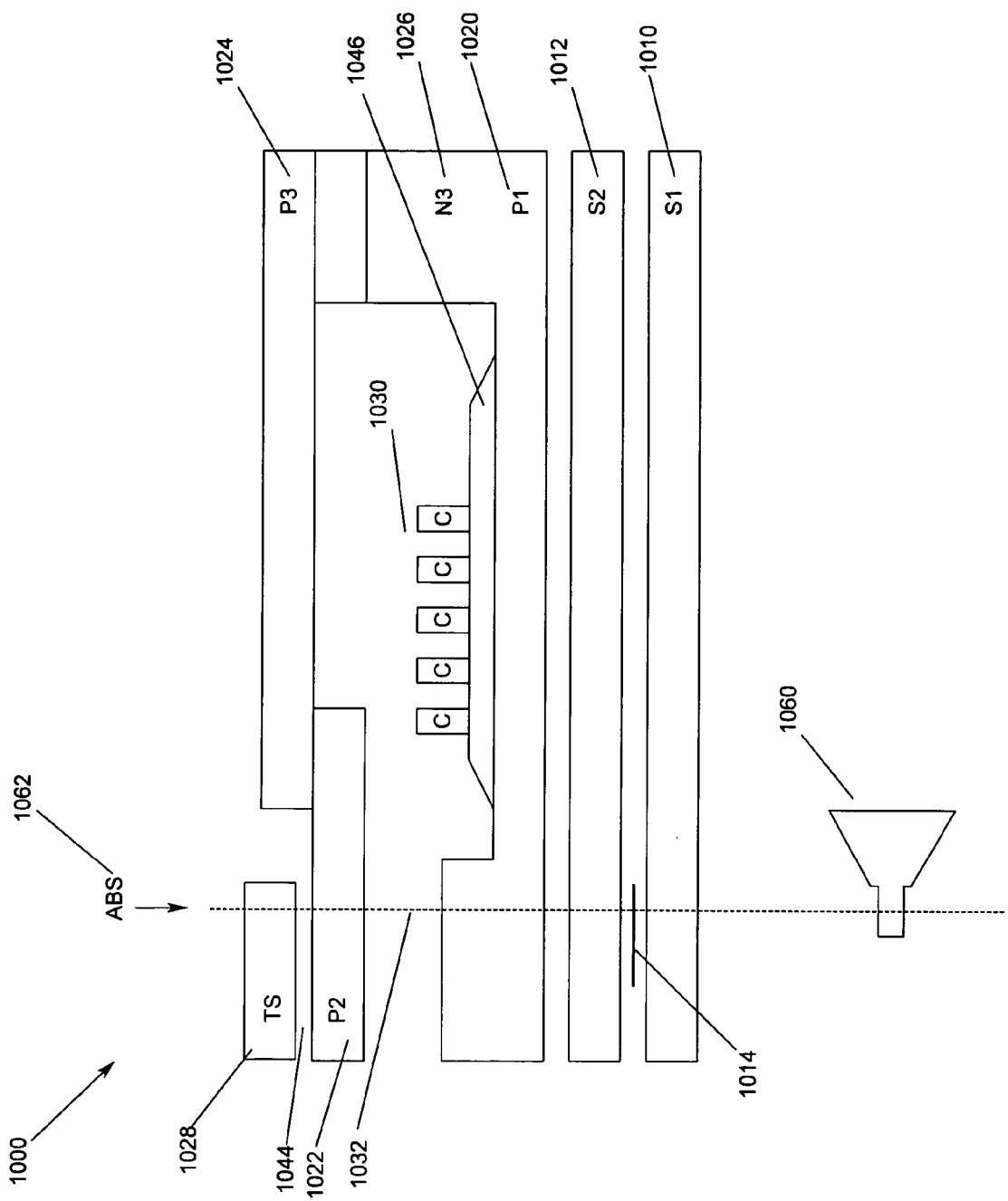
FIG. 10 illustrates a magnetic recording head built using an air-bearing surface damascene process according to an embodiment of the present invention.

FIG. 10 illustrates a magnetic recording head 1000 built using an air-bearing surface damascene process according to an embodiment of the present invention. In FIG. 10, a first 1010 and second 1012 shield are shown disposed about the GMR stripe 1014. First pole 1020, second pole 1022, third pole 1024, back gap 1026 and pseudo trailing shield 1028 layers are shown forming the write portion of the perpendicular head. The pseudo trailing shield layer 1028 is separated from second pole 1022 by a non-magnetic gap material 1044. A coil 1030 is formed between the first pole 1020 and the second and third poles 1022, 1024 over an insulation layer 1046. Current through the coil 1030 induces a magnetic field at the write gap 1032. However, rather than defining the write throat height at the wafer level, the throat height is defined at the "almost" finished slider level using a self aligned etching process and a "damascene" fill process.

During the fabrication of the magnetic recording head, an etchable nonmagnetic "pseudo trailing shield" material 1028, e.g. Si, $SiO_2$, Ta, W, etc., is deposited over the second pole 1022 instead of the desired final magnetic trailing shield material. The pseudo trailing shield layer 1028 is made larger in the direction perpendicular to the final ABS 1062 than the desired final magnetic trailing shield layer (not shown in FIG. 10), but should be the desired dimensions of the final magnetic trailing shield layer in the remaining 2 orthogonal dimensions. Alternatively, the dimensions of the final magnetic trailing shield layer in the remaining 2 orthogonal dimensions may be altered to account for a polish stop layer, as will be described below.

After wafer processing is complete, the ABS location 1062, or a plane very close to the final ABS 1062, is defined by row level or single slider level lapping using an electrical lapping guide (ELG) or the read sensor as a lapping guide. Then, the "pseudo trailing shield" layer 1028, which was deposited during the wafer process, is selectively etched, e.g., by RIE, to a depth equal to the desired trailing shield throat height or the throat height plus the thickness of an adhesion/polish stop layer.

By choosing a suitable pseudo trailing shield material 1028, there is no need to protect areas of the ABS 1062 using photo resist patterning prior to etching because the etching process can be made chemically selective. Alternatively the GMR sensor 1014 can be covered by a small island of resist because the RIE etch is selective to the pseudo trailing shield 1028 only and the dimensions of the area etched are controlled by one in-plane wafer dimension, i.e., into the plane when looking at FIG. 10, and the wafer level pseudo trailing shield layer 1028 thickness.

The pseudo trailing shield shape 1060 at the wafer level is also shown in FIG. 10. The pseudo trailing shield layer 1028 does not have to extend far beyond the intended ABS location 1062. Thus, the pseudo trailing shield layer 1028 can be recessed during most of the ABS lapping phase to reduce any concerns with new materials at the ABS 1062 during lapping, i.e., smearing, different lap rates, etc.

Figure 11:
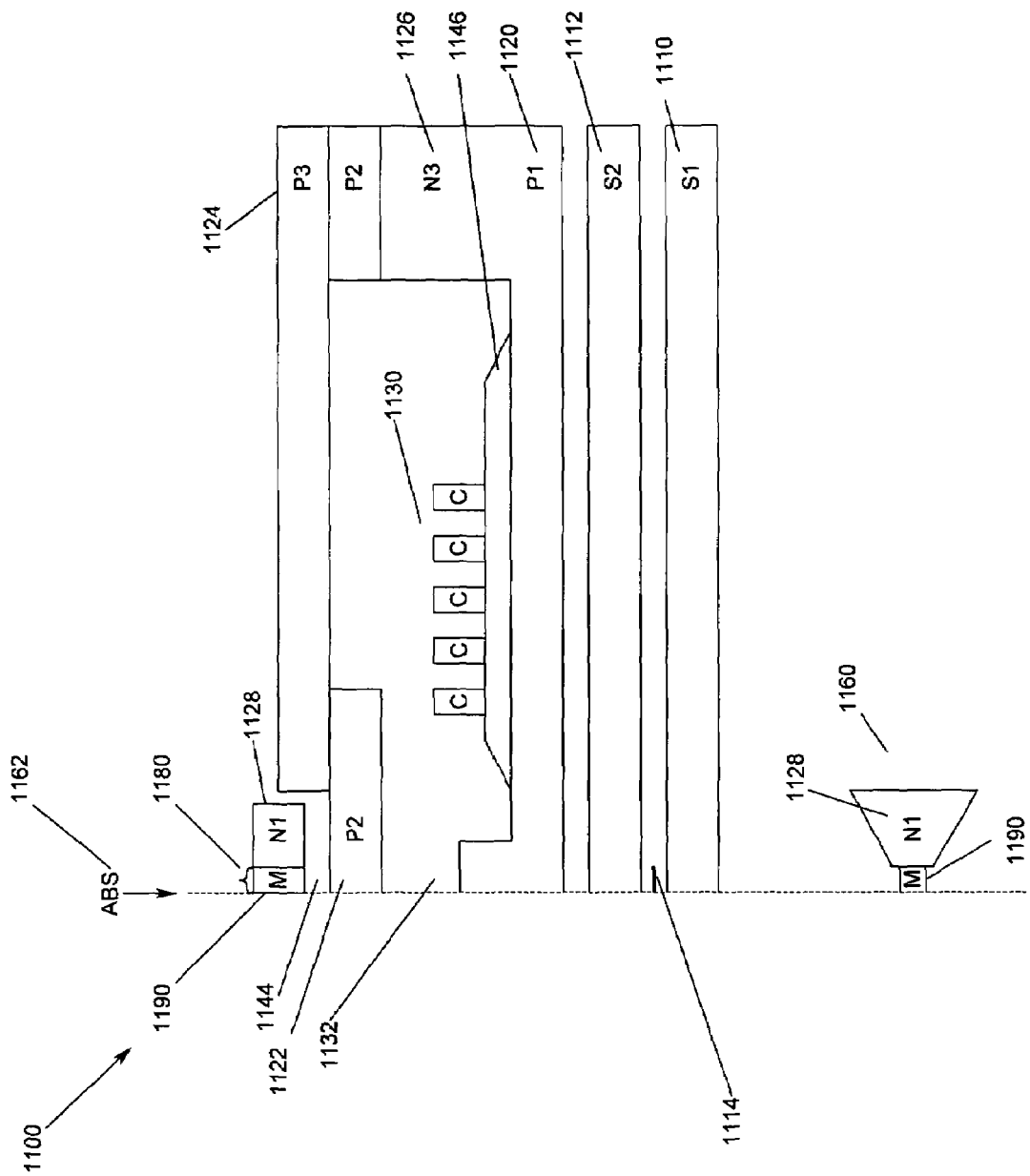
FIG. 11 shows a perpendicular head after depositing a magnetic material to fill the void left by the etched away portion of the pseudo trailing shield according to an embodiment of the present invention.

FIG. 11 shows a perpendicular head 1100 after depositing a magnetic material to fill the void left by the etched away portion of the pseudo trailing shield according to an embodiment of the present invention. In FIG. 11, a first 1110 and second 1112 shield are shown disposed about the GMR stripe 1114. First pole 1120, second pole 1122, third pole 1124, back gap 1126 and pseudo trailing shield 1128 layers are shown forming the write portion of the perpendicular head. The pseudo trailing shield layer 1128 is separated from second pole 1122 by a non-magnetic gap material 1144. A coil 1130 is formed between the first pole 1120 and the second and third poles 1122, 1124 over an insulation layer 1146. Current through the coil 1130 induces a magnetic field at the write gap 1132. The pseudo trailing shield shape 1160 at the wafer level is also shown in FIG. 11.

After the wafer processing is complete, the slider is lapped to form the ABS location 1162 or a plane very close to the final ABS 1162 and the pseudo trailing shield layer 1128 is selectively etched to a depth equal to a desired trailing shield throat height 1180. After the etching is performed, an optional, thin polish stop layer, e.g., W or C, can be vacuum deposited on the slider surface. A suitable magnetic material 1190, such as Ni, Fe, Co or their allows, is vacuum deposited onto the ABS to fill the void left by the removal of a portion of the pseudo trailing shield layer 1128.

This can be done with a vacuum deposition process, which covers the entire air bearing surface with magnetic material.

A subsequent lap or CMP process may be used to remove the excess vacuum deposited material and leave the magnetic trailing shield layer 1190 exposed at the ABS surface 1162 in a damascene like process to provide a final slider with the nonmagnetic "pseudo trailing shield" 1128 replaced with magnetic material 1190 extending to a depth equal to the desired throat height 1180 and referenced to the final ABS 1162. If the final lap or CMP polish requires a (thin) polish stop (e.g. W or C) this can be deposited prior to the deposition of the magnetic trailing shield material 1190 and subsequently removed by RIE. In this case the "pseudo trailing shield" layer 1128 dimensions, identified above as being equal to the final trailing shield dimensions, may be altered to account for this polish stop layer. Additionally the final lap of CMP could be the fine polish phase of a single slider lapping process. This could be the final phase of lapping in a single slider process. In which case the polish stop layer might not be necessary. If the polish stop layer is used it is then removed by RIE.

Figure 12:
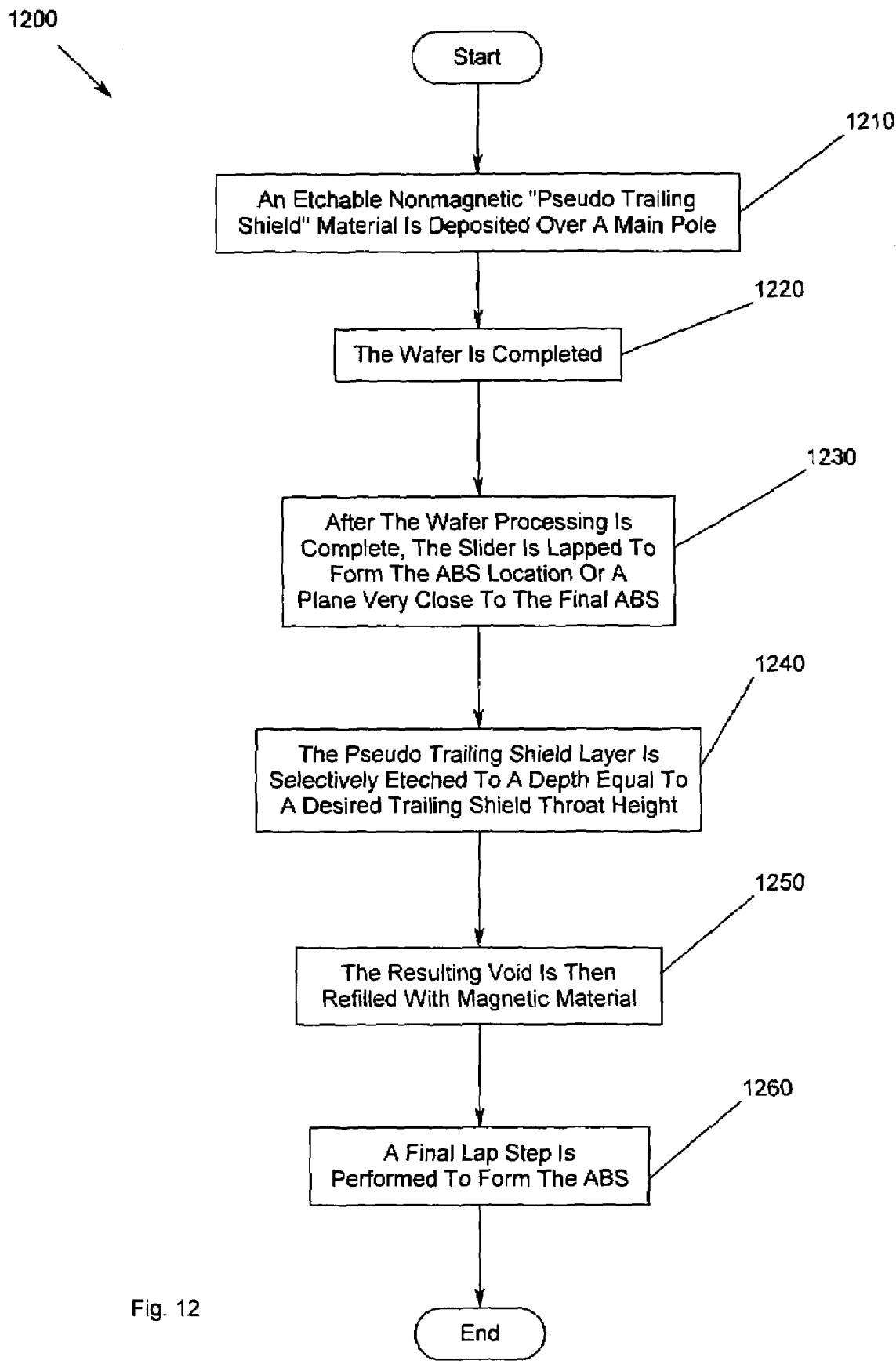
FIG. 12 is a flow chart of the method for making a perpendicular head that meets decreasing throat height tolerances with more accuracy than provided by photolithography resolutions according to an embodiment of the present invention.

FIG. 12 is a flow chart 1200 of the method for making a perpendicular head that meets decreasing throat height tolerances with more accuracy than provided by photolithography resolutions according to an embodiment of the present invention. An etchable nonmagnetic "pseudo trailing shield" material is deposited over a main pole 1210. The wafer is completed 1220. After the wafer processing is complete, the slider is lapped to form the ABS location or a plane very close to the final ABS 1230. The pseudo trailing shield layer is selectively etched to a depth equal to a desired trailing shield throat height 1240. The resulting void is then refilled with magnetic material 1250. A final lap step is performed to form the ABS 1260.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for forming a perpendicular magnetic recording head, comprising:
    depositing a non-etchable non-magnetic gap material over a main pole;
    depositing an etchable nonmagnetic material over the non-magnetic gap material;
    lapping the etchable nonmagnetic material, gap material and main pole to form an air-bearing surface;
    after lapping the etchable nonmagnetic material, gap material and main pole to form an air-bearing surface, selectively etching the etchable nonmagnetic material to produce a void having a predetermined depth; and
    filling the void with magnetic material to form a trailing shield over the non-etchable, non-magnetic gap material.

2. The method of claim 1 further comprising forming a read head, the forming the read head further comprising forming a first shield, forming a read stripe over the first shield and forming a second shield over the read stripe.

3. The method of claim 1 further comprising forming a first, a second and a third pole, the second and third poles forming the main pole.

4. The method of claim 3, wherein the forming the second and third pole further comprises forming the third pole over at least a portion of the second pole.

5. The method of claim 1, wherein the depositing an etchable nonmagnetic material further comprises depositing one material selected from the group comprising Si, $SiO_2$, Ta, and W.

6. The method of claim 1, wherein the lapping is performed after wafer processing is complete.

7. The method of claim 1, wherein the lapping is controlled using an electrical lapping guide (ELG).

8. The method of claim 1, wherein the lapping is controlled using the read sensor.

9. The method of claim 1, wherein the selectively etching is performed to produce a void having a depth equal to a desired trailing shield throat height.

10. The method of claim 1, wherein the selective etching is performed to produce a void having a depth equal to a throat height plus a thickness of an adhesion/polish stop layer.

11. The method of claim 2 further comprising covering the read stripe with a small island of resist to prevent etching thereof 12. The method of claim 1 further comprising depositing after the etching an optional, thin polish stop layer.

13. The method of claim 12, wherein the polish stop layer comprises a material selected from a group comprising W and C.

14. The method of claim 1, wherein the filling the void with a magnetic material further comprises using a material selected from a group comprising Ni, Fe, Co and their alloys.

15. The method of claim 1 further comprising removing excess vacuum deposited material while leaving the magnetic layer exposed at an ABS surface.

16. The method of claim 15, wherein the removing excess vacuum deposited material further comprises lapping to a desired ABS.

17. The method of claim 15, wherein the removing excess vacuum deposited material further comprises chemical-mechanical polishing the ABS to remove the excess vacuum deposited material.

18. A perpendicular magnetic recording head, comprising:
    a main pole;
    a non-etchable non-magnetic gap material deposited over the main pole;
    an etchable nonmagnetic material disposed over the non-etchable non-magnetic gap material, the etchable nonmagnetic material being recessed from a air-bearing surface plane by a predetermined depth; and
    magnetic material disposed over the main pole and non-etchable non-magnetic gap material adjacent to the etchable nonmagnetic material in an area between the etchable nonmagnetic material and the air-bearing surface plane to form a trailing shield.

19. The perpendicular magnetic recording head of claim 18 further comprising a first shield, a read stripe disposed over the first shield and a second shield disposed over the read stripe.

20. The perpendicular magnetic recording head of claim 18 further comprising forming a first, a second and a third pole, the second and third poles forming the main pole.

21. The perpendicular magnetic recording head of claim 20, wherein the forming the second and third pole further comprises forming the third pole over at least a portion of the second pole.

22. The perpendicular magnetic recording head of claim 18, wherein the nonmagnetic material further comprises a material selected from the group comprising Si, SiO$_2$, Ta, and W.

23. The perpendicular magnetic recording head of claim 18, wherein the magnetic material has an extent from a predetermined plane being equal to a desired throat height.

24. The perpendicular magnetic recording head of claim 18, wherein the magnetic material has a depth equal to the predetermined depth, the predetermined depth being equal to a throat height plus a thickness of an adhesion/polish stop layer.

25. The perpendicular magnetic recording head of claim 18, wherein the magnetic material further comprises a material selected from a group comprising Ni, Fe, Co and their alloys.

26. A magnetic storage system, comprising:
- at least one magnetic storage medium for storing data thereon;
- a motor for moving the at least one magnetic storage medium; and
- an actuator arm assembly including a perpendicular head for reading and writing data on each of the at least one magnetic storage medium, the actuator positioning the perpendicular head relative to the moving at least one magnetic storage medium;
- wherein the perpendicular magnetic recording head further comprises a main pole, an etchable nonmagnetic material disposed over a non-etchable non-magnetic gap material, the etchable nonmagnetic material being recessed from a air-bearing surface plane by a predetermined depth and magnetic material disposed over the main pole and non-etchable non-magnetic gap material adjacent to the etchable nonmagnetic material in an area between the etchable nonmagnetic material and the air-bearing surface plane to form a trailing shield.

27. The magnetic storage system of claim 26 further comprising a first shield, a read stripe disposed over the first shield and a second shield disposed over the read stripe.

28. The magnetic storage system of claim 26 further comprising forming a first, a second and a third pole, the second and third poles forming the main pole.

29. The magnetic storage system of claim 28, wherein the forming the second and third pole further comprises forming the third pole over at least a portion of the second pole.

30. The magnetic storage system of claim 26, wherein the nonmagnetic material further comprises a material selected from the group comprising Si, SiO$_2$, Ta, and W.

31. The magnetic storage system of claim 26, wherein the magnetic material has an extent from a predetermined plane, the extent being equal to a desired throat height.

32. The magnetic storage system of claim 26, wherein the magnetic material has a depth equal to the predetermined depth, the predetermined depth being equal to a throat height plus a thickness of an adhesion/polish stop layer.

33. The magnetic storage system of claim 26, wherein the magnetic material further comprises a material selected from a group comprising Ni, Fe, Co and their alloys.

34. A perpendicular magnetic recording head, comprising:
- means for providing a pole for a write means;
- means, disposed over the pole, for defining a throat height, the means for defining a throat height being etchable and recessed from an air-bearing surface plane by a predetermined depth; and
- means, disposed over the means for providing a pole for a write means and adjacent to the means for defining a throat height, for providing a magnetic layer, the means for providing a magnetic layer being disposed in an area between the means for defining the throat height and the air-bearing surface plane to form a trailing shield.

* * * * *